(12) United States Patent
Wormsbaecher et al.

(10) Patent No.: US 7,997,988 B2
(45) Date of Patent: Aug. 16, 2011

(54) DIRECT TORQUE FLOW CONSTANT VELOCITY JOINT FACE SPLINE CONNECTOR

(75) Inventors: Hans Wormsbaecher, Lake Orion, MI (US); Eric James LaMothe, Clinton Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 375 days.

(21) Appl. No.: 12/438,449

(22) PCT Filed: Aug. 23, 2006

(86) PCT No.: PCT/US2006/032710
§ 371 (c)(1),
(2), (4) Date: Feb. 23, 2009

(87) PCT Pub. No.: WO2008/024108
PCT Pub. Date: Feb. 28, 2008

(65) Prior Publication Data
US 2010/0285891 A1  Nov. 11, 2010

(51) Int. Cl.
*F16D 3/223* (2006.01)
(52) U.S. Cl. .................... 464/145; 464/182; 464/906
(58) Field of Classification Search .......... 464/144–146, 464/182, 906; 403/96, 97, 343, 364
See application file for complete search history.

(56) References Cited

U.S. PATENT DOCUMENTS

| | | | |
|---|---|---|---|
| 3,092,982 A | 6/1963 | Wildhaber | |
| 3,385,135 A * | 5/1968 | Strandberg | 464/145 |
| 3,760,605 A | 9/1973 | Schroder | |
| 4,053,248 A * | 10/1977 | Schultenkamper et al. | 403/97 |
| 4,460,058 A | 7/1984 | Welschof | |
| 5,469,931 A * | 11/1995 | Kawata et al. | 464/182 |
| 6,152,825 A | 11/2000 | Doell | |
| 6,158,916 A * | 12/2000 | Wormsbaecher | 464/146 |
| 6,599,050 B1 * | 7/2003 | Sjoo | 403/97 |
| 6,669,570 B2 * | 12/2003 | Krude | 403/364 |
| 7,335,108 B2 * | 2/2008 | Lin et al. | 464/182 |
| 2005/0170899 A1 * | 8/2005 | Dine et al. | 464/145 |

FOREIGN PATENT DOCUMENTS

WO WO 2006092121 A1 * 9/2006

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander

(57) ABSTRACT

A direct torque flow constant velocity joint connector includes an outer joint part, and inner joint part, a cage and a plurality of balls. The outer joint part includes outer ball tracks. The inner joint part includes inner ball tracks and a rotational axis, wherein the inner joint part has a face spline oriented about the rotational axis. The plurality of balls are provided in the cage and engage the inner and outer ball tracks of the respective inner and outer joint parts, thereby allowing torque transmission by way of the face splines. Also provided is a direct torque flow constant velocity joint connection.

19 Claims, 2 Drawing Sheets

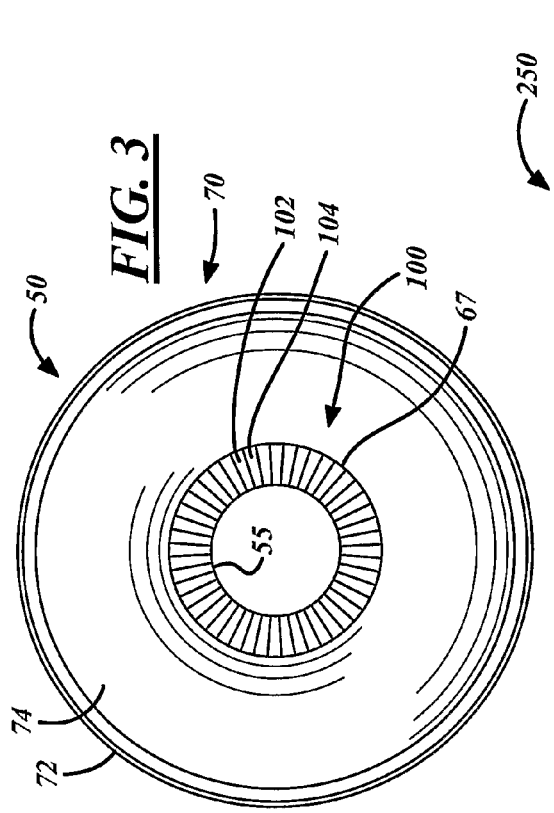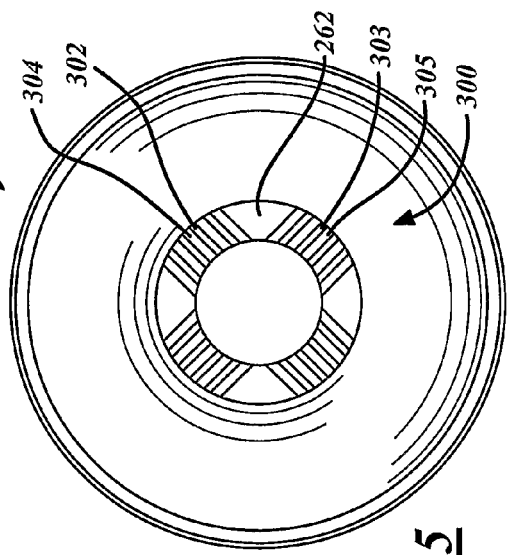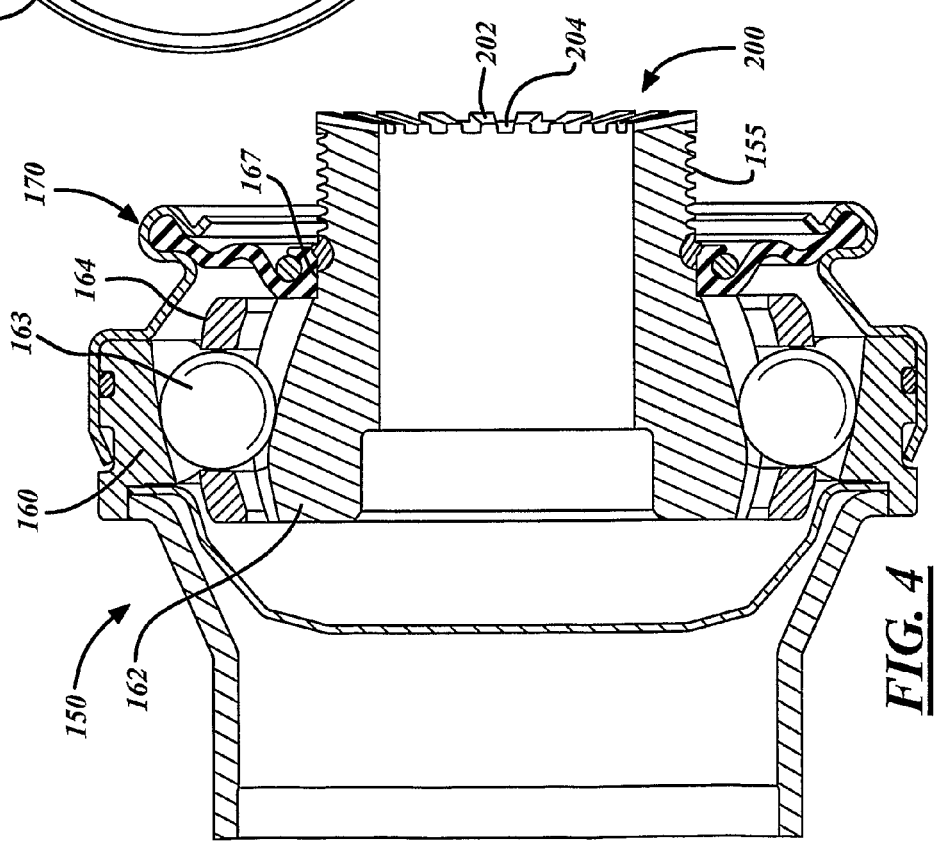

DIRECT TORQUE FLOW CONSTANT VELOCITY JOINT FACE SPLINE CONNECTOR

TECHNICAL FIELD

The present invention relates generally to motor vehicle shaft joints, and more particularly concerns a direct torque flow constant velocity joint having a face spline connection.

BACKGROUND ART

Constant velocity joints connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly, which is connected, for instance, at one end to an output shaft of a transmission and, at the other end, to an input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Connecting the shaft to a drive unit via the constant velocity joint (CVJ) in this manner is considered a traditional connection. Direct torque flow (DTF) connection is a newer connection style that has advantages and improvements over the traditional connection.

A DTF connection differs from a traditional connection in that the outer race is connected to the shaft that extends between different joints, and the inner race is connectable to the drive unit. One example of a DTF connection provides that the outer race of a CVJ is friction welded to a propeller shaft and the inner race of the CVJ includes a female spline that is connectable to a journal shaft of a transmission. Typically, the inner race of the CVJ is rotationally securable for torque transmission to the journal shaft by an axial spline and is axially retained thereto by a spring clip, a circlip or a threaded nut. However, while the splined connection is secured in the axial direction, the connection does not prevent radial and axial movement. Moreover, the axial spline may allow for undesirable debris and corrosion therein, making disassembly difficult and reducing the life expectancy of the drive shaft assembly.

It is desirable to have a DTF CVJ that overcomes the limitations indicated above. Moreover, it is desirable to have a DTF CVJ that provides for a connection to a drive unit while reducing axial and radial movement. Furthermore, it would be desirable to provide a DTF CVJ that improves installation or disassembly.

DISCLOSURE OF THE INVENTION

Accordingly, the present invention provides a direct torque flow constant velocity joint having a face spline connector. The face spline connector minimizes axial and radial movement. In addition, the face spline connector is directly securable to a mating end of a drive unit thereby improving installation or disassembly.

Specifically, a direct torque flow constant velocity joint connector includes an outer joint part, an inner joint part, a cage and a plurality of balls. The outer joint part includes outer ball tracks. The inner joint part includes inner ball tracks and a rotational axis, wherein the inner joint part has a face spline oriented about the rotational axis. The plurality of balls are provided in the cage and engage the inner and outer ball tracks of the respective inner and outer joint parts, thereby allowing torque transmission by way of the face splines.

The present invention will be best understood by reference to the following detailed description and taken in conjunction with the accompanying drawings.

BRIEF DESCRIPTION OF DRAWINGS

For a more complete understanding of this invention, reference should now be made to the embodiments illustrated in greater detail in the accompanying drawings and described below by way of examples of the invention.

FIG. 3 shows an axial view of the face spline connector shown in FIG. 2.

FIG. 4 shows a cross-sectional view of a second embodiment of a DTF CVJ having a face spline connector.

FIG. 5 shows an axial view of a third embodiment of an inventive DTF CVJ having a face spline connector.

DETAILED DESCRIPTION

In the following description, various operating parameters and components are described for one or more constructed embodiments. These specific parameters and components are included as examples and are not meant to be limiting.

While the invention is described with respect to a DTF CVJ having a face spline connector, the following apparatus is capable of being adapted for various connecting purposes including automotive vehicle drive axles, motor systems that use a propeller shaft, or other vehicles and non-vehicle applications which require propeller shaft assemblies for torque transmission.

Figure 1:
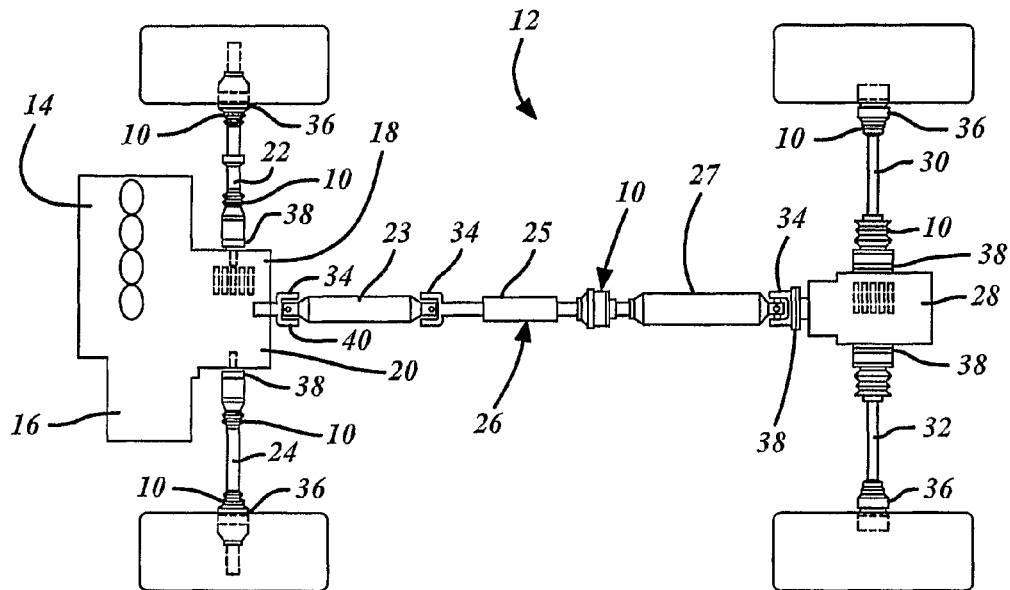
FIG. 1 shows a plan view of an exemplary drive system for a typical four-wheel drive automobile.

An exemplary drive system 12 for a typical four-wheel drive automobile is shown in FIG. 1. While a four-wheel drive system is shown and described, the concepts here presented could apply to a single drive unit system or multiple drive unit systems, including rear wheel drive only vehicles, front wheel drive only vehicles, all wheel drive vehicles, and four-wheel drive vehicles. In this example, the drive system 12 includes an engine 14 that is connected to a transmission 16 and a power take-off unit 18. A front differential 20 has a right hand side half shaft 22 and left hand side half shaft 24, each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising, or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in every day driving of automotive vehicles in both the half shafts, interconnecting shafts and propeller shafts of these vehicles. Optionally, each Cardan joint 34 may be replaced with any other suitable type of joint, including constant velocity joint types. The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 may be direct torque flow constant velocity joint (DTF CVJ) having a face spline connector in accordance with a first embodiment (FIG. 2), a second embodiment (FIG. 4) or a third embodiment (FIG. 5) of the invention.

Figure 2:
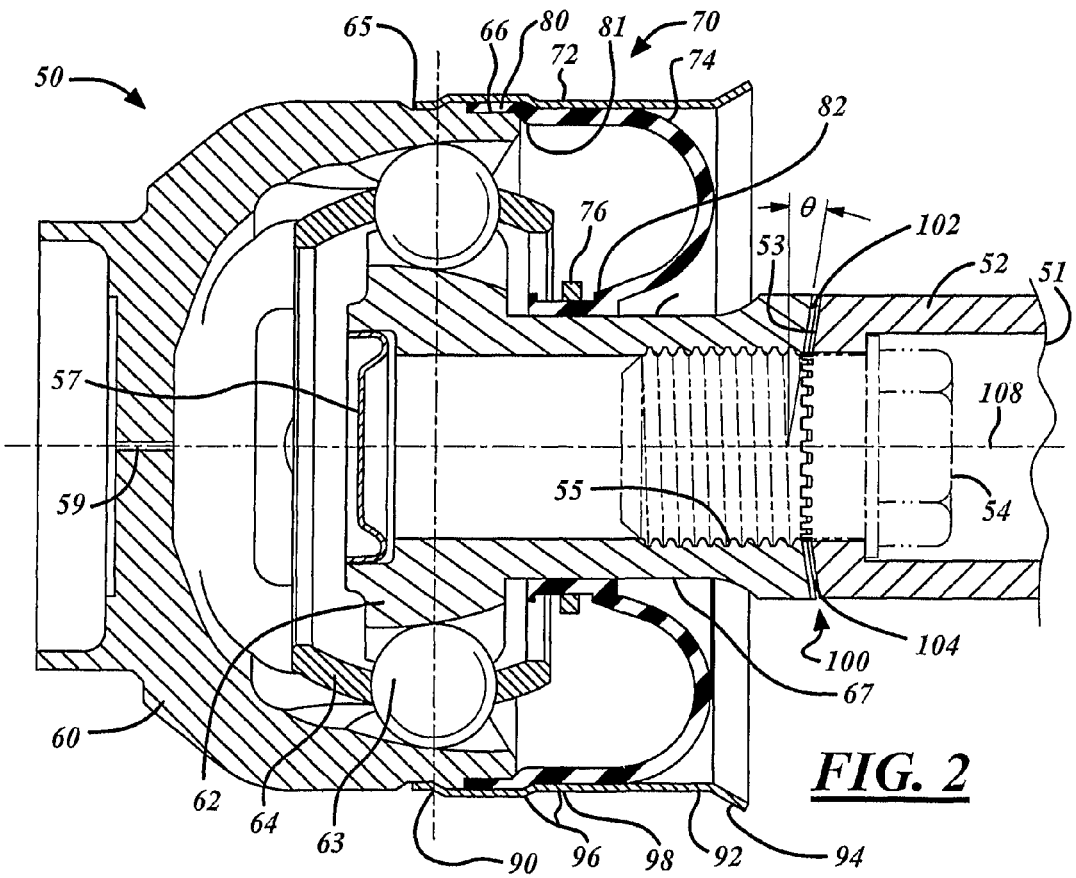
FIG. 2 shows a cross-sectional view of a first embodiment of a DTF CVJ having a face spline connector.

For completeness of the description of the first, second and third embodiments of the invention as given in FIGS. 2, 4 and 5, the term direct torque flow (DTF) connection refers to a connection from the inner race of a constant velocity joint (CVJ) to the shaft of a differential, transmission or transfer case, generally supplied by the customer. Thus, a DTF connection refers to the inner race coupling to the shaft of a drive unit, such as a differential, transmission or transfer case without limitation, as opposed to the traditional connection mentioned above.

Also, as used herein, a DTF connector refers to a joint coupled to a shaft that forms a DTF shaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

FIGS. 2 and 4 will initially be described jointly below to the extent that their details generally correspond to one another. However, each of the constant velocity joints given in the various embodiments of the invention may have additional or different features recognized by a person of skill in the art. FIGS. 2 and 4 each show a CVJ 50, 150, respectively, for connection, but only FIG. 2 includes a journal shaft 52 of a drive unit 51 coupled to the CVJ 50 and axially retained by a compression bolt 54 axially securing the shaft 52 to the CVJ 50. Generally, each CVJ 50, 150 includes an outer joint part 60, 160, an inner joint part 62, 162 having an attachment surface 67, 167, torque transmitting balls 63, 163, and a ball cage 64, 164, respectively. The balls 63, 163 are held in windows within the ball cage 64, 164, respectively. A boot assembly 70, 170 may be included to seal each CVJ 50, 150 between the inner joint part 62, 162, and the outer joint part 60, 160, respectively. Also, each CVJ 50, 150 may utilize one of the inventive face spline connectors 100, 200, respectively, to be described below. Before turning to the discussion of each inventive face spline connector, the representative constant velocity joint 50 given in FIG. 2 is first discussed.

The outer joint part 60 generally has a circumferential-shaped or semi-spherical bore therein and an outer surface. The outer joint part 60 is generally made of a steel material, however, it should be noted that any other type of metal material, hard ceramic, plastic, or composite material, etc. may also be used for the outer joint part 60. The material is required to be able to withstand the high speeds, temperatures and contact pressures required for the CVJ 50. The outer joint part 60 also includes a plurality of axially opposed ball tracks located on an inner surface thereof. The tracks generally form a spherical-shaped path within the inner surface of the outer joint part 60. The tracks are axially opposed such that one half of the ball tracks open to a side of the outer joint part 60 opposite to that of the other half of the ball tracks in any number of patterns. Optionally, for different types of CVJs, the ball tracks all may open or axially align on the same side of the outer race. Also, the ball tracks may be of a gothic or elliptical shape provided the pressure angle and conformity are maintained, or may be other shapes, as is understood by a person having skill in the art. It should be noted that in the first embodiment as shown in FIG. 2 is a four plus four constant velocity joint, which has a total of eight balls in the CVJ 50. While the CVJ 50 first embodiment is a DTF CVJ having a fixed CVJ arrangement, any constant velocity joint type may, be utilized. Further, it is recognized the CVJ may be a fixed or plunging CVJ, including without limitation a VL, RF, AC, DO, or tripod joints including other fixed or plunging CVJs. However, it should be noted that it is also contemplated that a joint may be made having any number of balls incorporating all of the features of the CVJ 50 according to the present invention.

The inner joint part 62 of the present embodiment generally has a circumferential shape. The inner joint part 62 is arranged within a bore of an outer joint part 60. An attachment or outer surface 67 of the inner joint part 62 includes a plurality of ball tracks that are axially opposed. The ball tracks generally have a spherical shape and are aligned with the ball tracks on the outer joint part 60 such that the axial angle will open in a similar or the same direction as the ball track directly aligned above it on the outer joint part 60. The ball tracks on the outer spherical surface of the inner joint part 62 have one half of the ball tracks axially oriented in one way while the other half of the ball tracks are axially oriented in the opposite direction. The ball tracks will open in an alternating pattern around the outer circumference of the inner joint part 62 in a matching relationship to that of the ball tracks of the outer joint part 60. It should be noted that in this embodiment the inner joint part 62 is made of steel, however, any other metal composite, hard plastic, ceramic, etc. may also be used.

The ball cage 64 generally has a ring-like appearance. The ball cage 64 is arranged within the bore of the outer joint part 60 such that it is not, in this embodiment, in contact with the inner surface of the outer joint part 60. The cage 64 has a plurality of oblong-shaped orifices or windows through a surface thereof. The number of windows may match the number of ball tracks on the outer joint part 60 and inner joint part 62 of the CVJ 50, which is eight windows therethrough in the present embodiment of the invention. The number of balls and windows may, however, differ. The cage 64 along with the inner joint part 62 are preferably made of a steel material but any other hard metal material, plastic, composite or ceramic, etc. may also be used.

The constant velocity joint 50 includes a plurality of balls 63. The balls 63 are each arranged within one or more windows of the cage 64 and within a ball track of the outer joint part 60 and of the inner joint part 62, respectively. More than one ball may be arranged within each of the windows or there may be no balls within a window. Therefore, the balls 63 will be capable of rolling in the axially opposed tracks aligned in the same direction.

The CVJ 50 may include a grease cap or barrier 57. The barrier is generally made of a metal material, however, any plastic, rubber, ceramic or composite material may also be used. The barrier is press fit or integrally constructed between the outer joint part 60 and the propeller shaft or between the inner joint part 62 and a journal shaft 52. However, any other securing method known may also be used such as fasteners, bonding, etc. The barrier will insure the grease, which is used as a lubricant, will remain within the CVJ 50. Optionally, a vent port 59 may be placed through the barrier or the outer joint part 60 to relieve, any internal pressure within the CVJ 50, and the vent port may include a valve.

The boot assembly 70 includes a boot cover or shroud 72 and a reversed internal radius diaphragm or rolling radial boot 74 that rolls outwardly from an attached CVJ 50. The boot assembly 70 is connected to a CVJ 50 for providing a protective barrier for the internal parts and lubrication retention therein. It is recognized that other types of boot assemblies would also be suitable for providing the protective barrier.

The boot 74 includes a compression section 80 at one end and an attachment section 82 at the other end. The first section 80 of the boot 74 is connected directly to the outer joint part 60 and further retained thereto by the shroud 72. Optionally, the first section 80 of the boot 74 is attached to the shroud 72, thereby being connectable, directly or indirectly, to the outer joint part 60. The second section 82 of the boot 74 is connected to an attachment surface 67 of an inner joint part 62 by resilient retention of the boot material, or by an optional retaining band or other fastener 76, and completes a sealed environment in the CVJ 50. The boot 74 may also include a compression lip 81 annularly extending around the first section 80 of the boot 74 to enhance the seal between the boot assembly 70 and the outer joint part 60.

The boot 74 may comprise any suitable material that is sufficiently flexible to allow the CVJ 50 to operate through a wide range of angles. Suitable materials include thermoplastic, rubber, silicone, plastic material and urethane, etc. Thermoplastic, rubber and silicone also provide good sealing properties for the boot 74.

The shroud 72 is generally annular having a compression portion 90 and a free portion 92 separated by a support portion 98 in the form of an axially extending flange. The compression portion 90 is for annularly receiving the boot 74 and sealingly connecting it to CVJ 50. In this embodiment, the compression portion 90 is crimped within a circumferential channel 65 located in the exterior of the outer joint part 60 of the CVJ 50. Also, the compression portion 90 may include a compression crease 96 that provides for additional compressive retention of compression lip 81 of the boot 74 against a recess 66 of the outer joint part 60 of the CVJ 50. The free portion 92 may also include an annular flare 94, which serves as a protective device for deflecting outside debris while supporting and retaining the boot 74. Moreover, the support portion 98 stabilizes the reversed internal radius diaphragm or rolling radial boot 74 by radially retaining the boot within the shroud 72 when the CVJ 50 undergoes angular and cyclic gyrations during operation. Generally, the shroud 72 provides protection to the boot 74 by minimizing external impact from debris.

The support portion 98 of the shroud 72 supports and radially retains the boot 74 as it is received during all angular displacements caused by the CVJ 50, while the free portion 92 only supports and radially retains the boot 74 as it rolls onto the second portion 92 caused by large angular displacements of the CVJ 50. Primarily, it is the free or open end of the second portion 92 of the shroud 72 that provides shielding or barrier for the boot 74 from external debris. The shroud 72 may be made from metal or other materials, including plastic, for example, that have a rigid quality when used as a substantially cylindrical shape. For the shroud 72 of this embodiment, it is beneficial to use a suitable material in the compression or first portion 90 that is also deformable to provide the required retention force when crimping the assembly 70 to the CVJ 50.

While the first embodiment of the invention is described for a particular CVJ having balls and sets of ball tracks for a particular type of constant velocity joint motion, it is recognized that any other suitable constant velocity balls and sets of ball tracks may be utilized with the current invention to advantage. Moreover, the CVJ may also be of the fixed or plunging type of joint as is recognized within the art. Because CVJs are well understood to a person of skill in the art, the CVJs as given in the second and third embodiments are discussed below to the extent necessary to present the various embodiments of the invention.

FIG. 2 shows a first embodiment of an inventive DTF CVJ 50 having a face spline connector 100 shown being used to advantage with a mating end 53 of a supplied shaft 52 of a drive unit 51. FIG. 3 shows an axial view of the face spline connector 100 shown in FIG. 2. The spline connector 100 is an axial extension of the inner joint part, 62, which includes in this embodiment an inner bore having threads 55 for receiving the compression bolt 54.

The face spline connector 100 allows the constant velocity joint 50 to be secured to the mating end 53 of the shaft 52 via face splines located on both an end of the shaft 52 and an end of the inner joint part 62. The face spline connector 100 generally has the appearance of a plurality of predefined teeth 102 that have specific heights and angled edges to allow for a secure connection between the inner joint part 62 and the shaft 52 while also reducing any noise or vibration that might be caused between a toothed connection in the constant velocity joint 50. As mentioned above, the shaft 52 is connected to the inner joint part 62 by the bolt 54 engaging inner threads 55 of the inner joint part 62. The plurality of teeth 102 are located on the face of each of the inner joint part 62 and the shaft 52 and are arranged at the outer periphery of both the inner joint part 62 and the shaft 52. The teeth 102 may be a continuous row of teeth 102 around the entire outer periphery or the teeth 102 may include predetermined gaps 104 built into the teeth 102, for less weight and easier mounting. The teeth 102 on both the inner joint part 62 and the shaft 52 in the embodiment shown generally have a square shaped tooth 102, however any other shaped tooth may be used depending on the design requirements of the constant velocity joint 50. Therefore, the teeth 102 on the inner joint part 62 will engage with the teeth 102 on the shaft 52 and create a rotateably fixed connection between the inner joint part 62 and the shaft 52 which will allow for rotational torque to be transferred through the constant velocity joint 50. Hence, it should be noted that different heights, widths and angles may be used on the teeth 102 of both the inner joint part 62 and the shaft 52 which will allow for specific torque transfer capabilities to be designed into the constant velocity joint 50 according to the invention.

To improve alignment accuracy, the plurality of teeth 102 and/or the predetermined gaps 104 may include a pressure angle $\theta$. The pressure angle $\theta$ extends from a rotational axis 108 outwardly through the plurality of teeth and/or predetermined gaps to the outer periphery thereof, thereby improving alignment and centering of the inner joint part 62 when connected to the shaft 52. In this embodiment, the pressure angle θ extends axially outward. It is recognized the pressure angle θ may optionally extend axially inward, may be concave or convex, or may be perpendicular to the rotational axis 108.

As previously mentioned, axial retention of the inner joint part 62 with the shaft 52 is by way of a compression bolt 54. Axial retention of the inner joint part 60 with the shaft 52 may be accomplished in other ways as would be recognized by a person of skill in the art. It is also recognized that axial retention of the inner joint part 62 with a shaft 52 may also be accomplished by a union, a nut, or other fastener just to name a few examples, without limitation.

FIG. 4 shows a second embodiment of an inventive DTF CVJ 150 having a face spline connector 200. The spline connector 200 includes in this embodiment outer threads 155 located on the attachment surface 167 for receiving a compression nut (not shown). The face spline connector 200 allows the constant velocity joint 150 to be secured to a supplied shaft. The face spline connector 200 generally has the appearance of a plurality of predefined teeth 202 that have specific heights and angled edges to allow for a secure connection between the inner joint part 162 and the supplied shaft. The plurality of teeth 202 are located on the face of the inner joint part 162 and are arranged at the outer periphery of the inner joint part 162. The spline connector 200 may be a continuous row of teeth 202 around the entire outer periphery or the teeth 202 may include predetermined gaps 204 built into the teeth 202. The teeth 202 on the inner joint part 162 in this embodiment are shown generally as U-shaped, however any other shaped tooth may be used depending on the design requirements of the constant velocity joint 150.

FIG. 5 shows an axial view of a third embodiment of a DTF CVJ 250 having a face spline connector 300. The face spline connector 300 of this embodiment generally has the appearance of a plurality of predefined teeth 302, 303 that have specific heights and angled edges to allow for a secure connection between the inner joint part 262 and a supplied shaft. The plurality of teeth 302, 303 are located on the axially flat face of the inner joint part 262 and are arranged at the outer periphery of the inner joint part 262. The spline connector 300 may include alternating rows of teeth 302, 303 and rows of gaps 304, 305, each row arranged on quadrants located on the outer periphery of the inner joint part 262. The teeth 302, 303 and the gaps 304, 305 on the inner joint part 262 in this embodiment are shown generally a$ straight rectangular shaped, however any other shaped tooth may be used depending on the design requirements of the constant velocity joint 250. The teeth 302, 303 and the gaps 304, 305 of this embodiment, are resultantly obtained by a two-step broaching process wherein a first radial pass of the inner joint part 262, the teeth 302 and the gaps 304 are formed in a first direction, and in a second radial pass of the inner joint part 262, the teeth 303 and the gaps 305 are formed in a second direction. However, any other manufacturing process may be used in other ways as would be recognized by a person of skill in the art.

While the material and manufacture of the some of CVJ parts have been discussed, appropriate selection for other parts would be well understood by a person of skill in the art.

From the foregoing, it can be seen that there has been brought to the art a new and improved direct torque flow constant velocity joint. While the invention has been described in connection with one or more embodiments, it should be understood that the invention is not limited to those embodiments. On the contrary, the invention covers all alternatives, modifications, and equivalents as may be included within the spirit and scope of the appended claims.

The invention claimed is:

1. A direct torque flow constant velocity joint connector comprising:
    an outer joint part having outer ball tracks;
    an inner joint part having inner ball tracks and a rotational axis;
    a cage; and
    a plurality of balls provided in said cage and engaging said inner and outer ball tracks,
    wherein said inner joint part includes a face spline about said rotational axis and said face spline is oriented on said inner joint part at a pressure angle.

2. The connector of claim 1 wherein said inner joint part includes an axial extension having said face spline.

3. The connector of claim 1 wherein said inner joint part includes an inner bore having threads adapted to engage a compression bolt.

4. The connector of claim 1 wherein said face spline includes a plurality of predefined teeth.

5. The connector of claim 4 wherein said predefined teeth are symmetrically located about said rotational axis.

6. The connector of claim 4 wherein said predefined teeth are square shaped adapted to engage corresponding teeth of a drive shaft.

7. The connector of claim 4 wherein said predefined teeth are located on an outer periphery of said inner joint part.

8. The connector of claim 1 wherein said face spline includes a plurality of predetermined gaps.

9. The connector of claim 8 wherein said predetermined gaps are symmetrically located about said rotational axis.

10. The connector of claim 1 wherein said pressure angle extends from said rotational axis outwardly through a plurality of teeth or a plurality of gaps located in said face spline.

11. The connector of claim 10 wherein said pressure angle extends axially outward.

12. The connector of claim 10 further comprising a boot assembly providing a protective barrier between said inner joint part and said outer joint part.

13. A direct torque flow constant velocity joint having a face spline connector comprising:
    an outer joint part having outer ball tracks;
    an inner joint part having inner ball tracks, an axial extension and a face spline oriented about a rotational axis at a pressure angle on said axial extension;
    a cage;
    a plurality of balls provided in said cage and engaging said inner and outer ball tracks; and
    a boot assembly providing a protective barrier between said inner joint part and said outer joint part.

14. The connector of claim 13 wherein said axial extension includes an outer surface having external threads for retaining said inner joint part to a drive shaft.

15. The connector of claim 13 wherein said face spline includes a plurality of teeth and or a plurality of gaps.

16. The connector of claim 13 wherein said face spline includes a plurality of teeth and a plurality of gaps symmetrically arranged around a face periphery of said inner joint part, wherein said teeth and said gaps are U-shaped.

17. The connector of claim 13 wherein said pressure angle is concave and extends from said rotational axis outwardly through a plurality of teeth or a plurality of gaps located in said face spline.

18. The connector of claim 13 wherein said face spline includes a plurality of straight teeth arranged in quadrants.

19. An assembly comprising:
an outer joint part having outer ball tracks;
an inner joint part having a rotational axis, inner ball tracks and a joint face spline oriented about said rotational axis at a pressure angle;
a cage;
a plurality of balls provided in said cage and engaging said inner and outer ball tracks;
a boot assembly coupled between said inner joint part and said outer joint part; and
a drive unit having a journal shaft having a mating face spline coupled to said joint face spline of said inner joint part.

* * * * *